United States Patent
Stephenson

(10) Patent No.: US 6,817,076 B1
(45) Date of Patent: Nov. 16, 2004

(54) SECURING PLUG IN OVER-SIZED HOLES

(76) Inventor: Alan Stephenson, 39 Horton Road, Datchet, Berkshire (GB), SL3 9EP (*) Notice: Subject to any disclaimer, the term of this patent is extended or adjusted under 35 U.S.C. 154(b) by 186 days.

(21) Appl. No.: 10/009,830
(22) PCT Filed: Jun. 14, 2000
(86) PCT No.: PCT/GB00/02298
§ 371 (c)(1), (2), (4) Date: Dec. 17, 2001
(87) PCT Pub. No.: WO00/79139
PCT Pub. Date: Dec. 28, 2000

(30) Foreign Application Priority Data

Jun. 17, 1999 (GB) .............................................. 9913987

(51) Int. Cl.⁷ .............................. B23P 6/00; F16B 13/06
(52) U.S. Cl. ................................ 29/402.09; 29/402.18; 411/44; 411/82
(58) Field of Search ......................... 29/402.09, 402.14, 29/402.18, 456, 530, 402.15, 402.17; 411/44, 74, 82, 915; 403/179, 265, 266, 267, 268, 269; 156/94; 264/36.2, 262

(56) References Cited

U.S. PATENT DOCUMENTS

| 846,493 | A | * | 3/1907 | Mallon | 411/82 |
| 1,234,176 | A | * | 7/1917 | Kennedy | 411/4 |
| 1,516,652 | A | * | 11/1924 | Tomkinson | 411/44 |
| 2,110,053 | A | * | 3/1938 | Phillips | 411/44 |
| 2,666,354 | A | * | 1/1954 | Dim et al. | 411/915 |
| 4,044,512 | A | * | 8/1977 | Fischer et al. | 52/127.4 |
| 4,139,323 | A | * | 2/1979 | Brandstetter | 405/259.5 |
| 4,263,832 | A | * | 4/1981 | Lang et al. | 411/82 |
| 4,741,141 | A | * | 5/1988 | Harke | 411/82 |
| 5,104,266 | A | * | 4/1992 | Daryoush et al. | 411/82 |
| 5,193,958 | A | * | 3/1993 | Day | 411/82 |
| 5,249,898 | A | * | 10/1993 | Stepanski et al. | 411/82.2 |
| 6,403,678 | B1 | * | 6/2002 | Surjan et al. | 523/211 |

FOREIGN PATENT DOCUMENTS

| DE | 629335 | * | 4/1936 |
| DE | 2413479 | * | 10/1974 |
| DE | 29617495 | * | 1/1997 |
| GB | 1459875 | * | 12/1976 |
| GB | 2207726 | * | 2/1989 |

* cited by examiner

Primary Examiner—David P. Bryant
(74) Attorney, Agent, or Firm—Diller, Ramik & Wight

(57) ABSTRACT

A method of securing a screw-receiving plug in an over-sized hole preformed in a fixture comprises the steps of: (a) providing at least one piece of a loosely-woven fabric carrying consolidated thereon a quick-setting filler material, which fabric piece is sized to envelop at least circumferentially the plug intended to be used; (b) enveloping the plug circumferentially in the fabric piece; (c) activating the filler material; and (d) inserting the enveloped plug in the hole in a manner such as to ensure filling of the hole by the enveloped plug. On setting, the activated filler material and fabric restrain the plug against rotation when a screw is being driven into the plug thereby to secure the screw in the fixture. The preferred filler material is plaster of Paris.

26 Claims, 2 Drawing Sheets

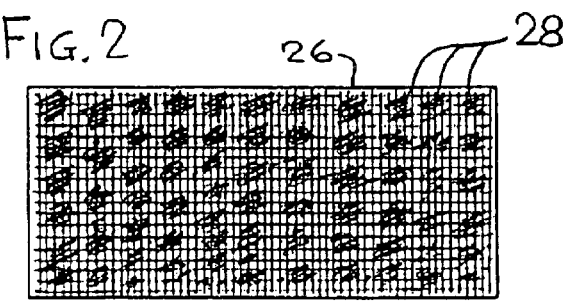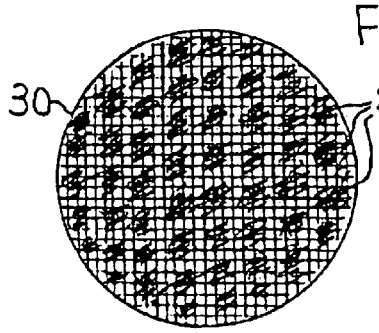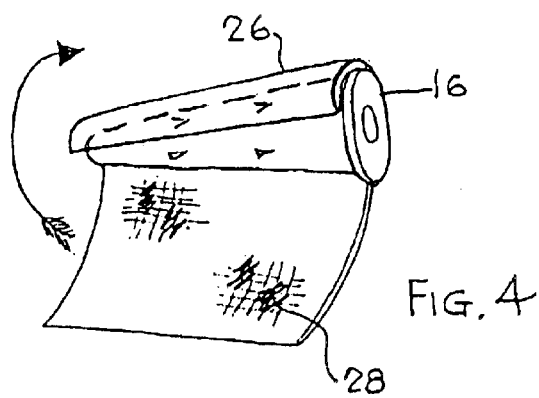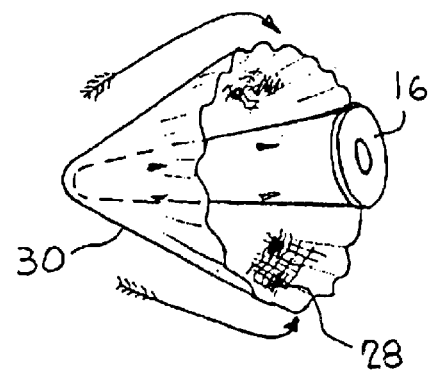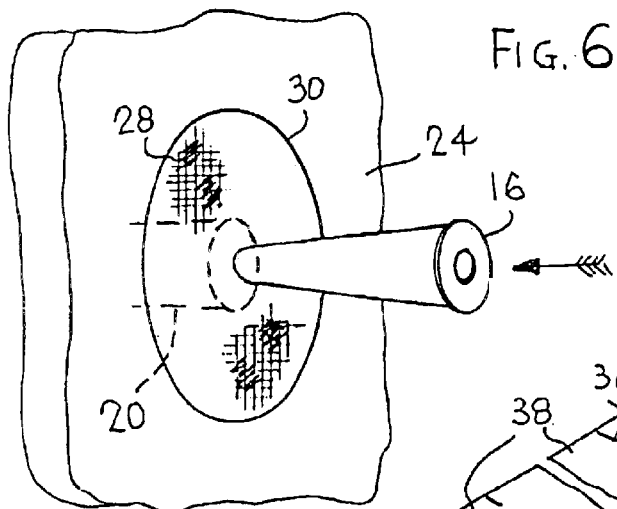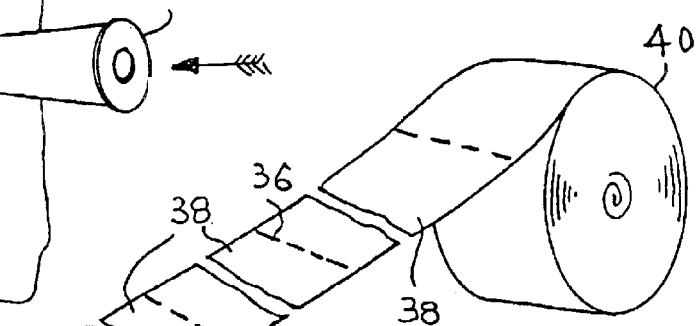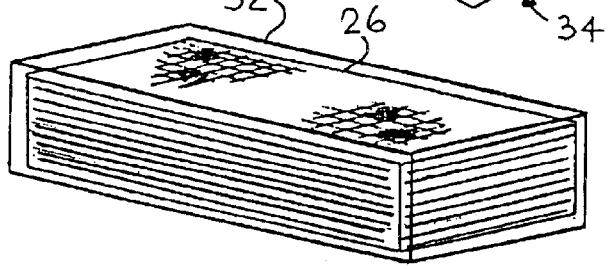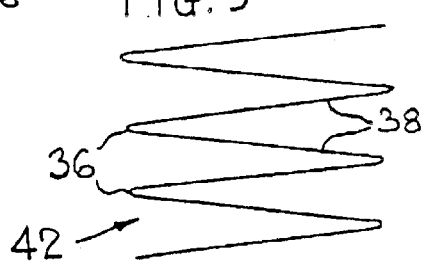

SECURING PLUG IN OVER-SIZED HOLES

BACKGROUND OF THE INVENTION

This invention relates to a method of securing plugs (particularly but not exclusively screw-receiving plugs) in oversized holes formed in fixtures,—thereby to enable, for example, screws, bolts or even nails to be secured in a fixture. The invention also provides means for use in carrying out that method.

In the description and claims that follow hereafter, the term "screws" will include "bolts" as well, and will encompass screws that have screw-threaded cylindrical shanks as well as screws having screw-threaded conical shanks.

Devices and appliances are frequently secured to a supporting fixture or structure (e.g. a wall, cabinet or panel) by means of screws. In some cases, such screws cannot be screwed directly into the structure because of the nature of the material of the structure, but instead are inserted into a plug of a screw-receiving material that has been previously inserted in a frictionally-engaging manner in a hole preformed in the structure. Driving the screw into the plug tends to radially enlarge the plug, thus causing the frictional engagement of the plug with the structure to intensify and thereby resist both longitudinal and rotational displacement of the plug within the hole as the screw is driven home to firmly secure the device or appliance to the structure.

Difficulties can arise in preforming the hole in the structure, for example—where the material of the structure is not homogeneous, or is easily eroded non-uniformly during the drilling of the hole. As a result, the hole is sometimes larger than desired (and/or mis-shapen) for the size of the plug intended to be engaged therein. This happens for example where the hole is being drilled in mortar bonds between bricks.

In such cases remedial measures may include using a larger plug to receive the plug or screw originally intended to be used, or simply a larger screw; or alternatively filling the over-sized hole with a suitable homogeneous plastic filler material, and then redrilling the necessary plug-receiving hole in the filler material after it has hardened.

Unfortunately, the latter procedure unduly prolongs the time of securing the screw since the hardening of the filler material requires a relatively long setting time before it can safely carry a load, because of the bulk of the filler material to be hardened, and its almost complete enclosure in the hole. Suitable plastic fillers include epoxy resins, but they are relatively expensive, require special mixing procedures, have long hardening times, and can present problems in safe handling and storage, e.g. dermatalogical problems for the user.

SUMMARY OF THE INVENTION

The present invention seeks to provide a method and means for enabling plugs (e.g. screw-receiving plugs) to be secured in circumstances where the preformed hole is unfortunately enlarged beyond the intended size, which method and means do not require resort to the use of a larger plug or screw, or a long filler-hardening time.

According to the present invention, a method of securing a plug, for example a screw-receiving plug, in an over-sized preformed hole comprises the steps of: (a) providing at least one piece or a loosely-woven fabric carrying consolidated thereon a quick-setting filler material, which fabric piece is sized to envelop at least circuferentially the plug intended to be used; (b) enveloping the plug at least circuferentially in the fabric piece; (c) causing activation of the filler material thereby to initiate hardening and eventual setting of the filler material; and (d) inserting the enveloped plug without delay in the oversized hole in a manner such as to ensure filling of the oversized hole with the enveloped plug. After the elapse of a relatively short filler-hardening time, the intended screw (or nail) may be inserted in and screwed into the plug.

By the term "loosely-woven fabric" is meant any fabric whether woven or knitted which is capable of constituting an open matrix material or substrate on to which the filler material may be consolidated or impregnated. This term shall be construed broadly in this manner wherever appropriate in this description and in the appended claims. Such a fabric may comprise for example a gauze material or a leno weave material.

Where the filler material requires activation by air, as in the case of some synthetic resin filler materials e.g. a polyurethane resin, activation will commence at the moment of releasing the fabric from an airtight storage container, so that enveloping the plug in the fabric occurs shortly after air activation has started.

Where the filler material requires activation by water, as in the case of one preferred filler material, for example plaster of Paris, activation is achieved by wetting the enveloped plug with water.

Enveloping the plug in the filler impregnated-fabric provides a reliable method of ensuring that sufficient filler material is carried with the plug into the hole to its fullest extent. This is extremely difficult to achieve without the fabric carried on the plug, so that safe securing of the plug in the oversized hole is then unpredictable and unreliable.

Water-activated filler materials have the advantage compared with the air-activated filler materials that they are relatively cheap and plentiful, and give rise to few dermatoligical problems for the user.

The preferred water-activated filler material comprises plaster of Paris, though any other suitable filler material manufactured from gypsum will suffice.

If desired, the filler material may have mixed with it short, strength-enhancing fibres or glass, carbon or other suitable material.

The fabric piece may be in the form of a tape or strip, and be wound on to the plug thereby to envelop it circumferentially. Alternatively, the fabric piece may be circular in shape, or substantially so, and be placed over the closed end of the plug and then smoothed longitudinally along the plug to the open end thereof so as to envelop it circumferentially in a substantially uniform manner.

According to a further aspect of the invention, there is provided for use in the method of the present invention a piece of a loosely-woven fabric carrying consolidated thereon a quick-setting filler material, which fabric piece is in the form of a tape which is transversely weakened at positions spaced along the tape so as to enable ready detachment of successive pieces as desired for use in practising a method according to the present invention.

Said filler material may, if desired, have mixed with it short, strength-enhancing fibres of glass, carbon or other suitable material.

The tape may be wound in the form of a roll, or alternatively it may be folded upon itself at said weakened positions in a fan-fold manner.

Where air-activated filler material is used, it is essential to enclose the fabric tape in an air-tight enclosure to prevent activation until the tape is about to be put into use.

Where water-activated filler material is used, it is necessary to enclose the fabric tape in a watertight enclosure so as to ensure its storage in a dry condition prior to use.

The present invention also provides for use in the method of the present invention an enclosure containing a selection of separate filler-carrying fabric pieces of substantially circular or rectangular configuration, which pieces may be all of one size, or of various sizes to suit different plug sizes.

Preferably, the airtight and watertight enclosures incorporate appropriate resealing means for maintaining respectively the airtightness and watertightness of the respective enclosures, and contain or carry printed instructions setting out the manner of using the fabric pieces in accordance with the present invention.

According to another aspect of the present invention, there are provided for use in carrying out the present invention ready-made (pre-prepared) units each comprising a said plug having secured therearound a sleeve (preferably closed at one end) of a said loosely-woven fabric carrying consolidated thereon a said quick-setting filler material, with or without said strength-enhancing fibres. Such fabric may be retained on the plug by being impaled on radial, retaining projections such as are commonly formed on screw-receiving plugs, or by an adhesive substance.

Other features of the present invention will appear from a reading of the description that follows hereafter and of the claims appended at the end of that description.

Various methods incorporating the present invention, of securing screws in a fixture, and means for use in practising those methods, will now be described by way of example, and with reference to the accompanying drawings, in which:

BRIEF DESCRIPTION OF THE DRAWINGS

FIGS. 2 and 3 show respectively rectangular and circular pieces or a woven fabric carrying an embedded filler material;

FIG. 4 shows in a pictorial manner a plastic screw-receiving plug around which is being wound the rectangular fabric piece of FIG. 2;

FIG. 5 shows in a pictorial manner a plastic screw-receiving plug along which is being pressed and smoothed the circular fabric piece of FIG. 3;

FIG. 6 shows in a pictorial manner a plastic screw-receiving plug about to be forced longitudinally along with a circular fabric piece of FIG. 3 into a hole preformed in the brick wall;

FIG. 7 shows in a pictorial manner a resealable waterproof enclosure containing several rectangular filler-carrying fabric pieces of the kind shown in FIG. 2;

FIG. 8 shows in a pictorial manner a filler-carrying woven fabric tape for use in providing as required detachable rectangular fabric pieces of the kind shown in FIG. 2, the tape being wound in the form of a roll;

FIG. 9 shows in a pictorial manner a filler-carrying woven fabric tape for use in providing as required detachable rectangular fabric pieces of the kind shown in FIG. 2, the tape being folded in a fan-fold manner.

DESCRIPTION OF THE PREFERRED EMBODIMENTS

Figure 1:
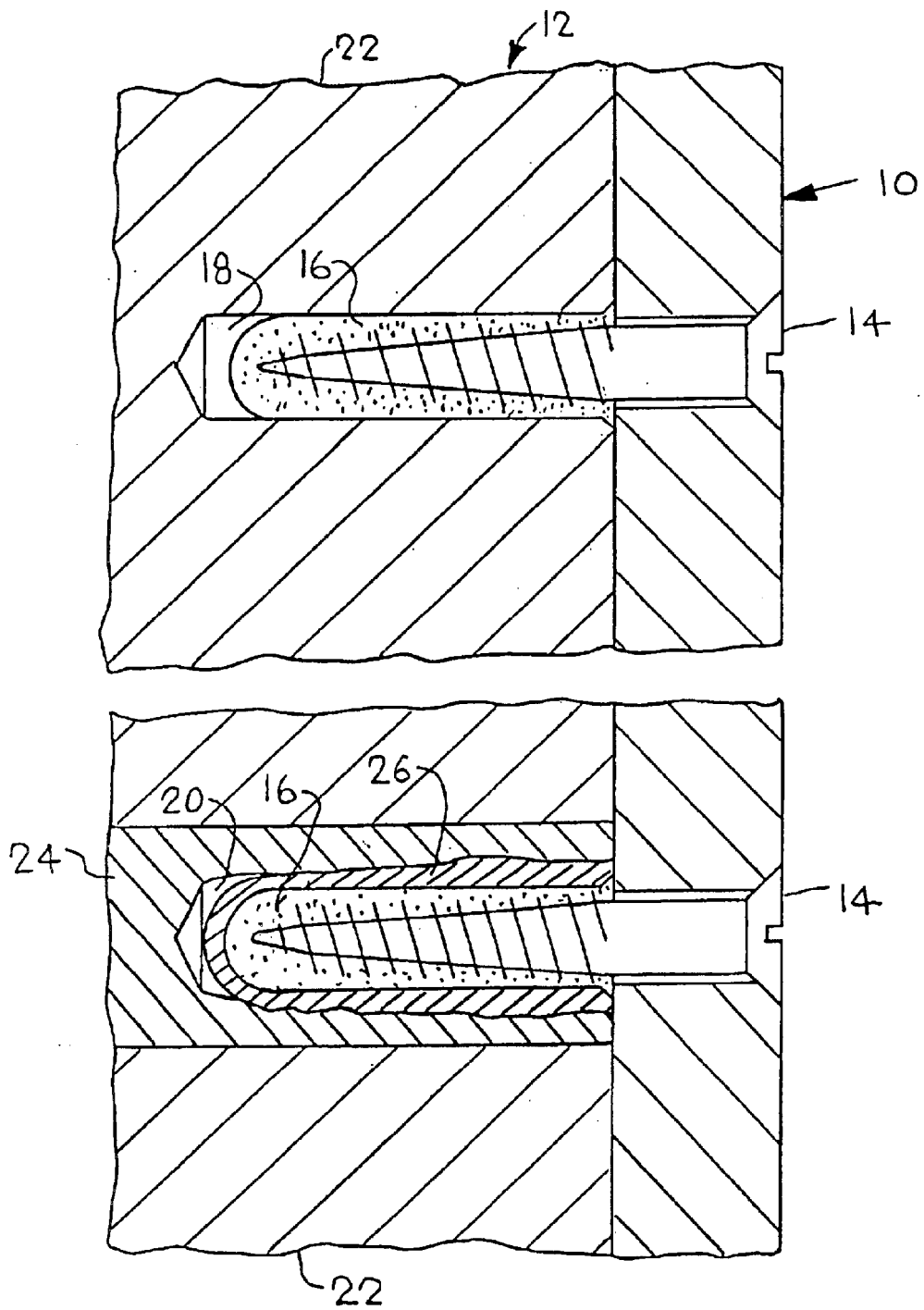
FIG. 1 shows a vertical sectional view of part of an appliance secured to a vertical brick wall by conventional wood screws, the section being taken in the plane including the longitudinal axes of two screws.

Referring now to the drawings, an appliance 10 is to be secured to a brick wall structure 12 in the manner shown in FIG. 1, by means of so-called 'wood screws' (i.e screws having screw-threaded conical shanks) 14, using plastic plugs 16 or conventional kind disposed in suitably positioned holes 18,20 preformed in the brick wall 12.

The intended positions of some of those holes (18) require drilling in the material of the bricks 22 themselves, so that no difficulty is normally encountered in drilling them to a diameter that is correct for the intended plastic plugs.

However, the intended positions of other holes (20) coincide with respective mortar bonds 24 disposed between adjacent bricks 22. Due to the weakness of the mortar often used in such bonds 24, or the presence of small chippings or pebbles in the mortar, drilling of those holes 20 with the requisite masonary drill can result in holes that are somewhat oversized and/or badly mis-shapen, as indicated in FIG. 1. As a consequence, the intended plastic plugs 16 are too small in diameter to frictionally engage with the encircling mortar, and so cannot receive and secure the screws intended to be engaged in the plugs. Hence, when a fixing screw 14 is presented to the plug 16 and rotated, the screw and the plug rotate together.

In a first embodiment of the present invention, this difficulty is overcome, in accordance with the principles of the present invention, by providing for each such oversized or mis-shapen hole 20 at least one piece 26 of a loosely-woven fabric (for example—cotton) carrying consolidated thereon a dry, water-activated, quick-setting filler material 28 (for example—plaster of Paris). Each such fabric piece 26 is sized to be capable of enveloping circuferentially at least a major part of the intended plastic plug 16 when engaged therearound.

The method of the present invention now involves for each plug 16 to be secured in a defective (i.e. over-sized or mis-shapen) hole 20, engaging one such fabric piece 26 securely around the plastic plug 16 so as to closely envelop it circumferentially along its length.

The fabric piece 26 and filler material 28 are then wetted with water so as to activate the filler material 28, and thereby initiate its setting (hardening) process.

The wetted, enveloped plug (16, 26, 28) is then inserted without delay into the defective hole 20 so as to substantially fill it, the fabric piece 26 and filler material 28 then occupying the spaces between the plug 16 and the bore of the hole 20.

After the elapse of the requisite (relatively short) filler-hardening time, the intended screw 14 is inserted in and screwed into the plug 16. The whole process may require only as little as five minutes.

Final tightening of the screw with the appliance in position is normally and preferably delayed for a few minutes further, up to a total of ten minutes setting time.

The fabric piece 26 may be in the form of a short tape or strip as indicated in FIG. 2, and be wound around the plug in the manner shown in FIG. 4 thereby in effect to enlarge its diameter.

Alternatively, and preferably, the fabric piece is in the form of a circular disc 30 as shown in FIG. 3, in which case the disc 30 may be placed against the closed end of the plastic plug 16 and then be smoothed axially along the length of the plug as indicated in FIG. 5, thereby to achieve a substantially uniform close engagement of the fabric piece around the plug.

An alternative procedure may be used instead if desired. Instead of applying the fabric piece 30 (or even 26) to the plug 16, then wetting it and forcing the plug enveloped in the fabric piece into the hole 20, the fabric piece 30 is first wetted to start the hardening process, and then placed centrally over the defective hole 20, as shown in FIG. 6, whereafter the plug 16 is pressed against the centre or the fabric piece thereby to carry the fabric piece with the plug as it is forced longitudinally into the defective hole, the fabric piece and filler material again filling the spaces between the plug 16 and the hole 20. Any unwanted parts of the fabric which protrude from the hole may be trimmed away with scissors or a craft knife.

Whilst in FIG. 3 the fabric piece 30 is circular in shape (as preferred), other quasi-circular shapes (polygonal for example) may be used instead, and even substantially square fabric pieces.

Where the oversizing of the drilled hole 20 is substantial, it may require the use of two (or possibly more) fabric pieces 26 or 30 lying on top of one another to provide the requisite amount of fabric and filler material to fill the spaces between the hole 20 and the plug 16. In this case, the process may require a slightly longer time (possibly as much as ten minutes) to achieve satisfactory securing of the plug, depending on how oversized the hole 20 is and thus how many pieces of filler-carrying fabric 26 or 30 needed to be used.

For use in practising the method of the present invention, there may be provided in a suitable water-proof package 32 a plurality of fabric pieces 26 or 30 of similar sizes, or as desired—assorted sizes. The fabric pieces may be separate one from another, ready for withdrawal one by one from the package.

Alternatively, the package 32 may enclose filler-carrying fabric in the form of a tape (or strip) 34, which tape has been weakened transversely (e.g. by perforations) at positions 36 spaced along the length,of the tape so as to enable separate pieces 38 of the tape to be readily detached. For convenience the tape may be wound in the form of a roll 40 as shown in FIG. 8. Alternatively, the tape may be folded repeatedly upon itself at the weakened positions 36 and packaged in fan-fold manner, as shown at 42 in FIG. 9.

The packages preferably include closure means (not shown) for resealing them in a water-proof manner after withdrawing a fabric piece.

Preferably, the packages carry within them or externally thereon a set of instructions for using the enclosed fabric pieces in accordance with the principles of the present invention.

It will be appreciated that the method of the present invention may be used in any situation where a plastic (or other) plug has to be disposed in any larger-than-desired hole.

Whilst the above description is directed to the securing or a wood screw in a plastic plug, the procedure described there is equally applicable to the securing of such a screw in any form of plug, whether it be of a plastics material, wood, or a metal. Furthermore, the procedure may be used in the same manner for securing plug devices intended for use with plasterboard panels, or for plugs intended to receive nails (instead or screws).

Moreover, the procedure described above may equally be used in respect of a bolt having a screw-threaded cylindrical shank and intended to form part of a masonry bolt device, or part of a plug device intended for use with plasterboard panels.

By quick-setting filler material is meant material that has typically a setting time of up to about ten minutes.

Fabric for use in practising the present invention may comprise fibres of cotton, or any suitable synthetic plastics material (e.g. polypropylene), or even carbon or glass, and may be woven or knitted in any suitable manner, regularly or randomly. Fabric or the kind known as "leno" weave fabric is particularly suitable. Gauze fabrics are also useful in the present context.

The quick-setting filler material may be any suitable material derived from gypsum, and which can be consolidated on and/or within the intertices of the woven fabric. Other water-activated filler materials may be used instead. If desired, short (preferably less than 5 mm in length), strength-enhancing fibres of glass, carbon or other suitable material may be mixed in with the filler material.

Figure 10:
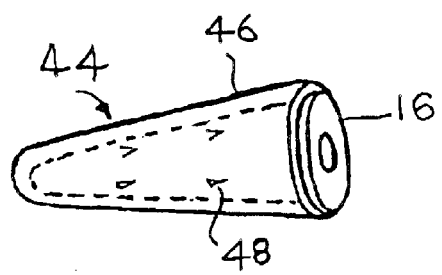
FIG. 10 shows in a pictorial manner a ready-made unit comprising a conventional plastic, screw-receiving plug such as is shown in FIGS. 4 and 5, having secured thereon a sleeve of a said loosely-woven fabric carrying an embedded filler material similar to the fabrics shown in the FIGS. 2 and 3.

For convenience of the user, there may be provided, and marketed as such, ready-made (pre-prepared) units 44 (FIG. 10) each comprising a screw-receiving plug 16, carrying thereon a sleeve 46, preferably closed at one end, of a loosely-woven fabric having consolidated thereon a said dry, water-activated, quick-setting filler material. The plug is similar to that shown (16) in the FIGS. 3 and 4, whilst the fabric and filler are similar to those (26–30) used in the FIGS. 2 and 3. The sleeve 46 is retained on the plug 16 by radial retaining projections 48 formed on the plug (also seen in FIGS. 4 and 5); if desired the sleeve may be secured instead by an adhesive.

One form of water-activated filler-carrying fabric (as referred to above) is currently used in the medical field, for the making of splints and casts. For example, plaster of Paris bandage commercially available under the trade mark "GYPSONA" from the company 'Smith and Nephew' has been successfully used in experiments with methods according to the present invention. It is described as comprising a 'leno weave gauze cotton' which carries gypsum.

Methods according to the above-described embodiment of the present invention have the advantages that they are simple, involve only simple non-damaging chemical materials, and are relatively swift to practise.

In a second embodiment of the present invention, the method of securing the plug 16 in the hole 20 is generally similar to that described in the above-described first embodiment, with the exception that the filler material 28 comprises instead an air-activated synthetic resin material, e.g. polyurethane resin. In this case activation of the filler material starts with the withdrawal of the filler-impregnated woven fabric 26,28 from its air-tight storage enclosure. Hence, there should be no appreciable delay in inserting the plug 16 with its enclosing filler-impregnated fabric 26,28 into the hole 20.

There is likewise currently available for use in the medical field, for the making of splints and casts, a loosely-woven fabric 26 carrying an air-activated filler material 28. That material is currently available under the trade name "DYNACAST EXTRA" from the company 'Smith & Nephew'. It is described as comprising a 'fibreglass knitted substrate' carrying a filler material comprising 'low tack polyurethane resin'. This second material has been successfully used in experiments concerning the present invention.

This second embodiment has the disadvantage compared with the first embodiment that the woven fabric carrying the resin filler material is relatively expensive, may adversely affect the user's skin, and needs greater care in handling it because of its sensitivity to air, which could result in premature hardening of the filler material before being brought into use.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of securing a screw (14) in a hole (18, 20) of a fixture (12) comprising the steps of:
    (i) providing a plug (16) which is adapted to receive and frictionally hold therein the screw (14);
    (ii) preforming a hole (18) in the fixture (12);
    (iii) inserting the plug (16) in the hole (18); and
    (iv) applying the screw (14) to the plug (16) and rotating the screw (14) to advance it into engagement with and retention in the plug (16) thereby to secure the screw (14) in the fixture (12); and
    when the plug (16) does not engage with a wall defining the hole (20) in a manner sufficient to prevent rotation of the plug (16) with the screw (14) on rotation of the screw (14), the hole (20) being thus over-sized in relation to the plug (16) and the plug (16) being carried only loosely in the hole (20), performing the steps of:
        (a) providing at least one piece of a loosely-woven fabric (26 or 30) carrying consolidated thereon a quick-setting filler material (28), which fabric piece (26 or 30) is sized to envelop at least circumferentially the plug (16);
        (b) withdrawing the plug (16) from the hole (20);
        (c) causing activation of the filler material (28) thereby to initiate hardening and eventual setting of the filler material (28);
        (d) placing the fabric piece (26 or 30) symmetrically over one end of the plug (16) and smoothing it longitudinally along the plug (16) so as to envelop the plug circumferentially in a substantially uniform manner;
        (e) inserting the enveloped plug (16, 26, 30, 28) without delay in the over-sized hole (20) in a manner such as to ensure filling of the oversized hole (20) with the enveloped plug (16, 26, 30, 28) whereby when the filler material (28) has hardened to prevent rotation of the plug (16) on rotation of the screw (14) to advance it into the plug (16); and
        (f) reapplying the screw (14) to the plug (16) only after the filler material (28) has at least partially hardened and rotating the screw (14) to advance the screw (14) into engagement with and retention in the plug (16) without rotation of the plug (16) thereby securing the screw (14) in the fixture (12).

2. The method as defined in claim 1 wherein the fabric piece (26 or 30) is shaped substantially in the form of at least one of a square, a polygon and a circle.

3. The method as defined in claim 1 wherein the fabric piece (26 or 30) is circular in shape.

4. The method as defined in claim 1 wherein the filler material (28) has mixed with it short, strength-enhancing fibres of a material capable of strengthening the filler material when set.

5. The method as defined in claim 1 wherein the fabric piece is loosely-woven fabric (26 or 30) carrying consolidated thereon a quick-setting filler material and which is sized for use with the plug (16) and shaped substantially in the form of at least one of a square, a polygon and a circle.

6. The method as defined claim 1 wherein the fabric piece (26 or 30) is pre-united with the plug (16) as a single unit (44) ready-for-use when required.

7. The method as defined in claim 1 wherein the filler material (28) is water activated.

8. The method as defined in claim 7 wherein the filler material (28) comprises plaster of paris.

9. The method as defined in claim 7 wherein the filler material (28) comprises a quick-setting material manufactured from gypsum other than plaster of paris.

10. A method of securing a screw (14) in a hole (18, 20) of a fixture (12) comprises the steps of:
    (i) providing a plug (16) which is adapted to receive and frictionally hold therein the screw (14);
    (ii) preforming a hole (18) in the fixture (12);
    (iii) inserting the plug (16) in the hole (18); and
    (iv) applying the screw (14) to the plug (16) and rotating the screw (14) to advance it into engagement with and retention in the plug (16) thereby to secure the screw (14) in the fixture (12); and
    when the plug (16) does not engage with a wall defining the hole (20) in a manner sufficient to prevent rotation of the plug (16) with the screw (14) on rotation of the screw (14), the hole (20) being thus over-sized in relation to the plug (16) and the plug (16) being carried only loosely in the hole (20), performing the steps of:
        (a) providing at least one piece of a loosely-woven fabric (26 or 30) carrying consolidated thereon a quick-setting filler material (28), which fabric piece (26 or 30) is sized to envelop at least circumferentially the plug (16);
        (b) withdrawing the plug (16) from the hole (20);
        (c) causing activation of the filler material (28) thereby to initiate hardening and eventual setting of the filler material (28);
        (d) placing the fabric piece (26 or 30) symmetrically over the hole (20);
        (e) placing one end of the plug (16) against the fabric piece (26 or 30);
        (f) pressing the plug (16) into the hole (20) without delay thereby causing (I) the fabric piece (26 or 30) to envelop the plug (16) circumferentially as it is carried by and with the plug (16) into the hole (20), and (ii) the plug, fabric piece and filler material to fill the oversized hole (20) whereby when the filler material (28) has hardened to prevent rotation of the plug (16) on rotation of the screw (14) to advance it into the plug (16); and
        (e) reapplying the screw (14) to the plug (16) only after the filler material (28) has at least partially hardened and rotating the screw (14) to advance the screw (14) into engagement with and retention in the plug (16) without rotation of the plug (16) thereby securing the screw (14) in the fixture (12).

11. The method as defined in claim 10 wherein the fabric piece (26 or 30) is shaped substantially in the form of at least one of a square, a polygon and a circle.

12. The method as defined in claim 10 wherein the fabric piece (26 or 30) is circular in shape.

13. The method as defined in claim 10 wherein the filler material (28) has mixed with it short, strength-enhancing fibres of a material capable of strengthening the filler material when set.

14. The method as defined in claim 10 wherein the fabric piece is loosely-woven fabric (26 or 30) carrying consolidated thereon a quick-setting filler material and which is sized for use with the plug (16) and shaped substantially in the form of at least one of a square, a polygon and a circle.

15. The method as defined claim 10 wherein the fabric piece (26 or 30) is pre-united with the plug (16) as a single unit (44) ready-for-use when required.

16. The method as defined in claim 10 wherein the filler material (28) is water activated.

17. The method as defined in claim 16 wherein the filler material (28) comprises plaster of paris.

18. The method as defined in claim 16 wherein the filler material (28) comprises a quick-setting material manufactured from gypsum other than plaster of paris.

19. A method of securing a screw (14) in a hole (18, 20) of a fixture (12) comprising the steps of:
  (i) providing a plug (16) adapted to receive and frictionally hold therein the screw (14);
  (ii) preforming a hole (18) in the fixture (12);
  (iii) inserting the plug (16) in the hole (18); and
  (iv) applying the screw (14) to the plug (16) and rotating the screw (14) to advance it into engagement with and retention in the plug (16) thereby to secure the screw (14) in the fixture (12); and when the plug (16) does not engage with a wall defining the hole (20) in a manner sufficient to prevent rotation of the plug (16) with the screw (14) on rotation of the screw (14), the hole (20) being thus over-sized in relation to the plug (16) and the plug (16) being carried only loosely in the hole (20), performing the steps of:
  (a) providing at least one piece of a loosely-woven fabric (26 or 30) carrying consolidated thereon a quick-setting, air-activated filler material (28), which fabric piece (26 or 30) is sized to envelop at least circumferentially the plug (16);
  (b) withdrawing the plug (16) from the hole (20) and enveloping it at least circumferentially in the fabric piece (26 or 30);
  (c) causing activation of the filler material (26) thereby to initiate hardening and eventual setting of the filler material (28);
  (d) inserting the enveloped plug (16, 26, 30, 28) without delay in the over-sized hole (20) in manner such as to ensure filling of the oversized hole (20) with the enveloped plug (16, 26, 30, 28), whereby when the filler material (28) has hardened to prevent rotation of the plug (16) on rotation of the screw (14) to advance it into the plug (16); and
  (e) reapplying the screw (14) to the plug (16) only after the filler material (28) has at least partially hardened and rotating the screw (14) to advance the screw (14) into engagement with and retention in the plug (16) without rotation of the plug (16) thereby securing the screw (14) in the fixture (12).

20. The method as defined in claim 19 wherein the fabric piece (26 or 30) is shaped substantially in the form of at least one of a square, a polygon and a circle.

21. The method as defined in claim 19 wherein the fabric piece (26 or 30) is circular in shape.

22. The method as defined in claim 19 wherein the filler material (28) comprises a polyurethane resin.

23. The method as defined in claim 19 wherein the filler material (28) has mixed with it short, strength-enhancing fibres of a material capable of strengthening the filler material when set.

24. The method as defined in claim 19 wherein the fabric piece is loosely-woven fabric (26 or 30) carrying consolidated thereon a quick-setting filler material and which is sized for use with the plug (16) and shaped substantially in the form of at least one of a square, a polygon and a circle.

25. The method as defined claim 19 wherein the fabric piece (26 or 30) is pre-united with the plug (16) as a single unit (44) ready-for-use when required.

26. A method of securing a screw (14) in a hole (18, 20) of a fixture (12) comprising the steps of:
  (i) providing a plug (16) which is adapted to receive and frictionally hold therein the screw (14);
  (ii) preforming a hole (18) in the fixture (12);
  (iii) inserting the plug (16) in the hole (18); and
  (iv) applying the screw (14) to the plug (16) and rotating the screw (14) to advance it into engagement with and retention in the plug (16) thereby to secure the screw (14) in the fixture (12); and when the plug (16) does not engage with a wall defining the hole (20) in a manner sufficient to prevent rotation of the plug (16) with the screw (14) on rotation of the screw (14), the hole (20) being thus over-sized in relation to the plug (16) and the plug (16) being carried only loosely in the hole (20), performing the steps of:
  (a) providing at least one piece of a loosely-woven fabric (26 or 30) carrying consolidated thereon a quick-setting filler material (28), which fabric piece (26 or 30) is sized to envelop at least circumferentially the plug (16);
  (b) withdrawing the plug (16) from the hole (20) and enveloping it at least circumferentially in the fabric piece (26 or 30);
  (c) causing activation of the filler material (28) thereby to initiate hardening and eventual setting of the filler material (28);
  (d) inserting the enveloped plug (16, 26, 30, 28) without delay in the over-sized hole (20) in a manner such as to ensure filling of the over sized hole (20) with the enveloped plug (16, 26, 30, 28) whereby when the filler material (28) has hardened to prevent rotation of the plug (16) on rotation of the screw (14) to advance it into the plug (16);
  (e) reapplying the screw (14) to the plug (16) only after the filler material (28) has at least partially hardened and rotating the screw (14) to advance the screw (14) into engagement with and retention in the plug (16) without rotation of the plug (16) thereby securing the screw (14) in the fixture (12); and
  (f) the fabric piece (26 or 30) is circular in shape.

* * * * *